United States Patent Office 3,012,042
Patented Dec. 5, 1961

3,012,042
BENZOFURANS
Nguyen Phuc Buu Hoi, Paris, France, and Camille Beaudet, Brussels, Belgium, assignors, by mesne assignments, to Societe Belge de l'Azote et des Produits Chimiques du Marly, Liege, Belgium
No Drawing. Filed Dec. 19, 1957, Ser. No. 703,755
Claims priority, application Belgium Dec. 21, 1956
8 Claims. (Cl. 260—346.2)

This invention relates to substituted coumarones corresponding to the general formula:

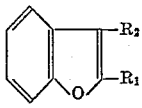

in which $R_1$ is a hydrocarbon radical such as ethyl, propyl or benzyl when $R_2$ is p-hydroxyphenylacetyl, a halogenated or non-halogenated p-hydroxybenzoyl or a halogenated or non-halogenated p-hydroxyphenylcarbinyl or $R_1$ is a halogenated p-hydroxybenzoyl when $R_2$ is hydrogen or ethyl.

To facilitate description, the process of preparation of the different coumarones involved has been divided into three main stages, of which the end-products correspond to the following three sub-formulae:

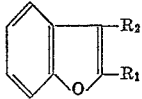
(I)

in which $R_1$ is ethyl, propyl or benzyl when $R_2$ is p-hydroxyphenylacetyl or p-hydroxybenzoyl, and $R_1$ is p-hydroxybenzoyl when $R_2$ is hydrogen or ethyl.

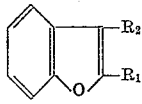
(II)

in which $R_1$ is ethyl, propyl or benzyl and $R_2$ is p-hydroxyphenyl carbinyl or halogenated-p-hydroxyphenylcarbinyl.

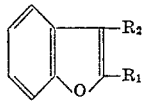
(III)

in which $R_1$ is ethyl, propyl or benzyl when $R_2$ is a halogenated p-hydroxybenzoyl and $R_1$ is a halogenated p-hydroxybenzoyl when $R_2$ is ethyl or hydrogen.

It has been observed that a large number of the substituted coumarones defined by the general formula above possess marked spasmolytic properties likely to render them useful in therapeutics. It is also anticipated that certain of these derivatives can be used in other indications, some of them for example having shown interesting properties as coronary vasodilators.

Recent trials, in which the activity of derivatives corresponding to the above general formula were compared with one of the most effective spasmolytic agents known, namely 5:8 - dimethoxy - 2 - methylfurano(4':5'–6:7)chromone, gave very promising results. Details of these results are given hereunder:

| | Degree of activity as compared with 5:8-dimethoxy-2-methylfurano(4':5'–6:7)chromone | |
|---|---|---|
| | On the isolated intestine of guinea-pig | On the isolated rabbit's heart |
| 5:8 - dimethoxy - 2 - methylfurano(4':5'–6:7)chromone | 1 | 1 |
| 2.ethyl.3.(4'.hydroxybenzoyl)coumarone | 12.5 | 33 |
| 2.ethyl.3.(4'.hydroxy - 3'.5'.dibromo.benzoyl)coumarone | 15 | 40 |
| 2.benzyl.3.p-hydroxybenzoyl coumarone | 7.5 | (1) |
| 2.propyl.3.p-hydroxybenzoyl coumarone | 15 | 50 |
| 2 . ethyl . 3 . p - hydroxyphenylcarbinyl-coumarone | 9 | 25 |
| 2 . ethyl . 3 . (4'. hydroxy . 3'. diiodo . benzoyl)coumarone | 27.5 | 100 |
| 2.ethyl.3.(4'.hydroxy.3'.5'.diiodo.phenylcarbinyl)coumarone | 11 | 30 |
| 2 . ethyl . 3 . (p - hydroxyphenylacetyl)-coumarone | 15 | 40 |
| 2.(4'.hydroxy.3'.chloro-benzoyl)coumarone | 1.25 | (1) |
| 2.(4'.hydroxy.3'.fluoro-benzoyl)coumarone | 1 | (1) |
| 2 . ( . 4'. hydroxy . 3'. 5'. diiodo . benzoyl)-coumarone | 18 | 16 |
| 3.ethyl.2.(4'.hydroxy.3'.5'.dibromo.benzoyl)coumarone | 16 | 43 |
| 2.(4'.hydroxy.3'.5'.diiodo.benzoyl).3.ethyl coumarone | 25 | 66 |

[1] No test made.

As is shown by the above figures, the vast majority of the substituted coumarones cited are many times more active as spasmolytics than the 5:8-dimethoxy-2-methylfurano(4':5'–6:7)chromone, a fact which renders them valuable additions to the therapeutic arsenal. Their usefulness in therapeutics is even further enhanced by the fact that the toxicity of these substituted coumarones is very slight, the $LD_{50}$, determined by intraperitoneal route in mice, being between 100 and 200 mg./kg.

In 1955, there appeared in the Journal of the Chemical Society (pp. 3693–3695) an article, entitled "2-Benzoyl-benzofurans and Related Compounds With Biological Interest," by M. Bisagni, Ng. Ph. Buu Hoi and R. Royer which dealt with compounds related to those covered by the present application. However, the authors in question were concerned with the oestrogenic activity, and more particularly with the chemical aspect, of the compounds they had studied. Nothing in the article cited gave any grounds whatever for supposing that the compounds described in the present application would exhibit such surprisingly effective spasmolytic properties, particularly as there is no connection between oestrogenic and spasmolytic activities. Furthermore, the article in the Journal of the Chemical Society stressed the importance of a hydroxy-group in the 2-aroyl substituent as a requirement for oestrogenic activity. As shown by the table given above, this observation does not hold for the compounds covered by the present application. In confirmation of this fact, trials along the lines of those reported above were made with the following compounds, two of which were cited in the article in question, and the results indicated obtained:

| | Degree of activity as compared with 5:8-dimethoxy-2-methylfurano(4':5'-6:7)chromone | |
|---|---|---|
| | On the isolated intestine of guinea-pig | On the isolated rabbit's heart |
| 2.p.hydroxybenzoyl coumarone | 2 | 4 |
| 2.p.hydroxybenzoyl.3.ethyl coumarone | 1 | (¹) |
| 2.p.-hydroxybenzoyl.4:6.dimethoxy coumarone | 0.6 | (¹) |
| 2.p.hydroxybenzoyl.6.hydroxy coumarone | 1 | (¹) |
| 2.benzoyl.6.hydroxy coumarone | 2 | (¹) |

[1] No trial performed as initial findings considered sufficiently indicative.

These results show clearly that, contrary to the findings published in the cited article of the Journal of the Chemical Society, the presence of a p-hydroxy-group in the 2-aroyl substituent is of no consequence in the case of the invented compounds. Comparison between the last two compounds indicated above would, in fact, suggest that as far as spasmolytic activity is concerned a p-hydroxy-group in the 2-aroyl substituent could even entail a loss of activity.

The process of preparation of the various substituted coumarones constituting the invention may be described as follows:

*Preparation of 2.alkyl (2.aralkyl)3.p-hydroxybenzoyl (or 3.p-hydroxyphenylacetyl) coumarones and 2.p-hydroxybenzoyl.3.ethyl (or 3.hydrogen) coumarones, corresponding to Sub-Formula I*

In the first stage of the synthesis of these substituted coumarones, an alkaline salt of an o.hydroxylated aromatic aldehyde or alkylphenone is reacted with a ketone halogenated in α in accordance with the process described by Rap in the Gaz. Chim. Ital. 1895, 25, II, 285. The compounds obtained are purified by crystallization or distillation. In this way, the following ketones may be obtained:

2.propionyl coumarone, B.P. 135° C./15 mm. Hg.
2.acetyl coumarone, B.P. 233° C./9 mm. Hg (M.P. 76° C.).
2.benzoyl coumarone, B.P. 360° C. (M.P. 91° C.).
2.p-anisoyl coumarone, M.P. 97° C.
2.p-anisoyl.3.ethyl coumarone, B.P. 245°–247° C./17 mm.

In the next state, when a 2-alkyl (or 2-aralkyl) coumarone is required, the ketone group of the corresponding compounds so prepared is reduced by hydrazine hydrate in an alkaline medium by the process of Huang-Minlon, Am. Soc., 1946, 68, 2487. In this manner, the following compounds are obtained:

2.propyl coumarone, B.P. 112° C./17 mm.
2-ethyl coumarone, B.P. 211–212° C.
2-benzyl coumarone, B.P. 184–189° C./13 mm.

These 2.alkyl and 2.aralkyl coumarones are condensed with anisoyl chloride or p-methoxyphenylacetyl chloride in the presence of tin tetrachloride according to the process described by Bisagni et al., Soc. London, 1955, 3694, and thus the following compounds may be obtained:

2.ethyl.3.anisoyl coumarone, B.P. 226° C./15 mm.
2.propyl.3.anisoyl coumarone, B.P. 189° C./0.5 mm.
2-benzoyl.3.anisoyl coumarone, M.P. 35° C.
2.ethyl.3.p-methoxyphenylacetyl coumarone, B.P. 228° C./1 mm.

Finally, all the methoxylated derivatives so prepared are demethylated according to the process described by Prey in Ber. Chem. Ges. 1941, 74, 1219, which consists in heating the original compound with pyridine hydrochloride at 200°–220° C.

In this manner, the following may be obtained:

2.ethyl-.3.p-hydroxybenzoyl coumarone, M.P. 124.3° C.
2.propyl.3.p-hydroxybenzoyl coumarone, M.P. 123° C.
2-benzyl.3.p-hydroxybenzoyl coumarone, M.P. 151° C.
2.ethyl.3.hydroxyphenylacetyl coumarone, M.P. 110° C.
2.p-hydroxybenzoyl coumarone, M.P. 192°–193° C.
2.p-hydroxybenzoyl.3.ethyl coumarone, M.P. 167°–168° C.

*Preparation of 2.alkyl (or 2.aralkyl) 3.p-hydroxyphenylcarnyl (halogenated or not) coumarones corresponding to Sub-Formula II*

The compounds corresponding to Sub-Formula II may be prepared by reduction of the ketone group contained in the compounds corresponding to Sub-Formula I by means of isopropyl alcohol and aluminium isopropylate according to the method of Meerwein-Pondorf, R. Adams: Org. Reactions, II, p. 203. The reduction products thus obtained may be halogenated.

In this way, the following may, for example, be obtained: 2.ethyl.3.p - hydroxyphenylcarbinyl coumarone, M.P. 74° C., which may be converted to the corresponding halogenated derivative, for example by reacting with iodine to give 2.ethyl.3.(4'.hydroxy.3'.5'.diiodo.phenylcarbinyl) coumarone, M.P. 100° C.

*Preparation of 2.alkyl (or 2.aralkyl).3.(p-hydroxy-halogenobenzoyl) coumarones and 2(p-hydroxy-halogenobenzoyl).3.alkyl (or 3.hydrogen) coumarones, corresponding to Sub-Formula III*

These compounds are obtained by halogenation of the corresponding hydroxylated non-substituted compounds. In this way, the following may be obtained:

2.ethyl.3.(4'.hydroxy.3'.5'.dibromo-benzoyl) coumarone, M.P. 151° C.
3.ethyl.2.(4'.hydroxy.3'.5'.dibromo-benzoyl) coumarone, M.P. 127° C.
2.ethyl.3.(4'.hydroxy.3'.5'diiodo-benzoyl) coumarone, M.P. 167° C.
2.(4'.hydroxy.3'.chloro-benzoyl) coumarone, M.P. 190° C.
2.(4'.hydroxy.3'.fluoro-benzoyl) coumarone, M.P. 150° C.
2.(4'.hydroxy.3'.5'.diiodo-benzoyl) coumarone
2.(4'.hydroxy.3'.5'.diiodo-benzoyl).3.ethyl coumarone The various processes described generally above may be illustrated by the following non-limitative examples:

EXAMPLE A

*Preparation of 2.propyl.3.p-hydroxybenzoyl coumarone (Sub-Formula I)*

To a solution of potassium hydroxide (56 g.=1 mole) in absolute ethyl alcohol (750 cc.) is added one mole of salicylic aldehyde (122 g.). The mixture is brought to boiling point in a water-bath until the potassium salt formed is dissolved. One mole of ethylchloromethylketone (106.5 g.) is gradually added and the solution boiled in a reflux condenser for two hours. After cooling, the potassium chloride precipitate is separated off by filtration, and the greater part of the solvent removed by distillation. The residue is then purified by distillation. In this way, 140 g. of 2.propionyl coumarone are obtained, boiling at 135° C. under 15 mm. Hg. A mixture is then prepared as follows:

| | | |
|---|---|---|
| 2.propionyl coumarone | g | 215 |
| Diethylene glycol | cc | 550 |
| Hydrazine hydrate at 85% | g | 200 | and maintained at boiling point in a reflux condenser for 10 minutes. After cooling, 180 g. of potassium hydroxide are added and the mixture brought up to 120–130° C. This temperature is maintained until no more nitrogen is liberated (about 1 hours). The mixture is then distilled by means of super-heated steam (150°–160° C.). The distillate is neutralized by means of concentrated HCl, decanted, and the aqueous layer extracted by means of ether. The oily layer and the ethereal extract are mixed, washed with diluted HCl, then with water, and finally dried over sodium sulfate. The solvent is removed and the residue rectified under reduced pressure. In this way, 130 g. of 2.propyl coumarone are obtained, boiling at 112° C. under 17 mm. of mercury.

The following substances are then placed in a 250 cc. flask fitted with a stirrer and a separatory funnel:

| | | |
|---|---|---|
| 2.propyl coumarone | g | 12.96 |
| Carbon sulfide | cc | 55 |
| Anisoyl chloride | g | 14 |

The mixture is cooled by means of iced water and 21.5 g. of stannic chloride introduced dropwise, while the mixture is stirred. Stirring is continued for three hours at 0° C., after which the mixture is allowed to stand overnight. 50 cc. of carbon sulfide is added and the mixture is treated, while being stirred, with the following:

| | Cc. |
|---|---|
| HCl | 20 |
| Iced water | 100 |

The organic layer is decanted and washed with water, dried over silica gel and rectified.

16.16 g. of 2.propyl.3.anisoyl coumarone are obtained (yield: 72%), boiling at 189° C. under 0.5 mm. Hg.

The methoxylated coumarone so obtained is mixed as follows:

| | P. |
|---|---|
| 2.propyl.3.anisoyl coumarone | 1 |
| Pyridine hydrochloride | 2 | and the mixture maintained for one hour under a stream of dry nitrogen in an oil bath at 210° C. (under a vertical condenser). After cooling, the mixture is triturated with 0.5 N hydrochloric acid (10 p.). The aqueous layer is separated and the residue extracted with ether. The ethereal extract is treated with 20 p. of 1% caustic soda. The alkaline layer is separated by decanting and acidified by means of diluted HCl. The precipitate is purified by recrystallization in aqueous acetic acid.

0.8 p. of 2.propyl.3.p-hydroxybenzoyl coumarone is obtained, melting at 123° C.

EXAMPLE B

*Preparation of 2.ethyl.3.(p-hydroxyphenylcarbinyl) coumarone (Sub-Formula II)*

The following are mixed together:

| | | |
|---|---|---|
| 2.ethyl.3.p-hydroxybenzoyl coumarone | mole | 0.025 |
| Isopropyl alcohol | cc | 75 |
| Aluminium isopropylate | mole | 0.025 |

By means of a Hahn partial condenser, the acetone formed is distilled. The reaction is terminated after 10 hours. The isopropyl alcohol is removed under vaccum, the residue is taken up in diluted hydrochloric acid and extracted with ether. The solvent is removed and the residue dried by means of benzene. The residue is taken up again in diluted sodium hydroxide and the solution filtered. The filtrate is neutralized with N sulfuric acid. The resultant 2.ethyl.3.p-hydroxyphenylcarbinyl coumarone is centrifuged, washed with water and dried. M.P. 74° C.

EXAMPLE C

*Preparation of 2.(4'.hydroxy.3'.5'.diiodo-benzoyl).3.ethyl coumarone (Sub-Formula III)*

8.05 g. of 3.ethyl.2.p-hydroxybenzoyl coumarone, prepared as described above, are dissolved in a very slight excess of 3% caustic soda. To this solution is gradually added a slight excess of iodine dissolved in a 25% aqueous solution of potassium iodide. The resultant solution is acidified with a 20% solution of sodium bisulfite, centrifuged, washed with water and then dried under vacuum. The product is then recrystallized in acetic acid and 13.6 g. of 2(4'.hydroxy.3'.5'.diiodo-benzoyl).3.ethyl coumarone obtained. M.P. 176° C.

Various alterations may be made to the different processes described hereabove without departing from the spirit and scope of the invention.

What we claim is:
1. 2.ethyl.3.(4'.hydroxybenzoyl)coumarone.
2. 2.ethyl.3.(4'.hydroxy.3'.5'.diiodo - benzoyl)coumarone.
3. 2.propyl.3.(4'.hydroxybenzoyl)coumarone.
4. 2.ethyl.3.(p-hydroxyphenylacetyl)coumarone.
5. 2.ethyl.3.(4'.hydroxy.3'.5'.dibromo - benzoyl)coumarone.
6. 2.(4'.hydroxy.3'.5'.diiodo.benzoyl)coumarone.
7. 2.(4'.hydroxy.3'.5'.dibromo.benzoyl).3.ethyl coumarone.
8. 2.(4'.hydroxy.3'.5'.diiodo.benzoyl).3.ethyl coumarone.

References Cited in the file of this patent

Beilstein: vol. 17–19, first suppl., p. 77.
Beilstein: vol. 18, Mainwork, p. 60 (1934).
Fuson: J. Org. Chem., vol. 6 (1941), pp. 845–851 (page 845 of article).
Mackenzie et al.: J. Chem. Soc. (London, 1949), pp. 2057–61.
Bisagni et al.: J. Chem. Soc., vol. 1955, pp. 3693–95 (abstracted in C.A. 50: 9372c).